United States Patent [19]

Yamaoka et al.

[11] Patent Number: 4,905,799
[45] Date of Patent: Mar. 6, 1990

[54] SHOCK ABSORBER

[75] Inventors: Fumiyuki Yamaoka; Mitsuo Sasaki, both of Kanagawa, Japan

[73] Assignee: Atsugi Motor Parts Company, Limited, Kanagawa, Japan

[21] Appl. No.: 332,469

[22] Filed: Apr. 3, 1989

[30] Foreign Application Priority Data

Apr. 4, 1988 [JP] Japan .............................. 63-45454[U]
Feb. 15, 1989 [JP] Japan .................................. 1-35486

[51] Int. Cl.⁴ ............................................. F16F 9/52
[52] U.S. Cl. ................................ 188/322.15; 188/282; 188/317; 188/322.22; 188/280
[58] Field of Search ....................... 188/322.15, 322.13, 188/322.22, 322.14, 281, 282, 317, 280

[56] References Cited

U.S. PATENT DOCUMENTS 4,809,829 3/1989 Hummel et al. ................. 188/282 X
4,821,852 4/1989 Yokoya ........................... 188/322.15

FOREIGN PATENT DOCUMENTS 4668764 1/1966 Australia .
6380465 3/1967 Australia .
310966 9/1967 Australia .
6169169 4/1971 Australia .
2622777 1/1979 Australia .

Primary Examiner—Douglas C. Butler
Attorney, Agent, or Firm—Bachman & LaPointe

[57] ABSTRACT

A shock absorber is provided a piston stroke dependent variable shock absorbing characteristics by a first and second flow restrictions associated with a piston. The first and second flow restrictions are arranged in a fluid path for communicating first and second working chambers defined within a shock absorber cylindrical housing in series. The first flow restriction associated with an orifice forming a part of the fluid path and has a predetermined relief pressure, for providing a predetermined first fixed flow restriction rate in response to a pressure difference between the first and second chambers smaller than or equal to the relief pressure and providing a second variable flow restriction rate in response to a pressure difference between the first and second chambers greater than the relief pressure. The second flow restriction is associated with the orifice for providing a third variable flow restriction rate variable depending upon the pressure difference between the first and second chamber.

18 Claims, 8 Drawing Sheets

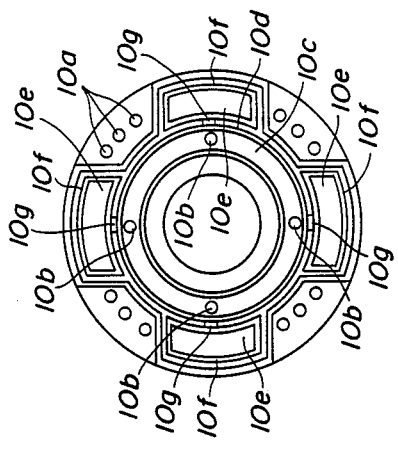
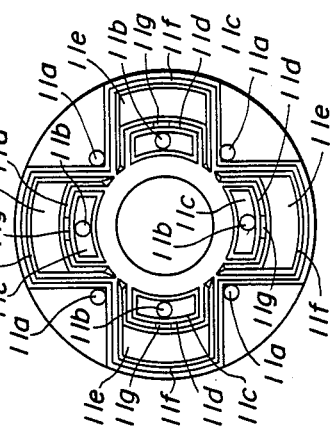
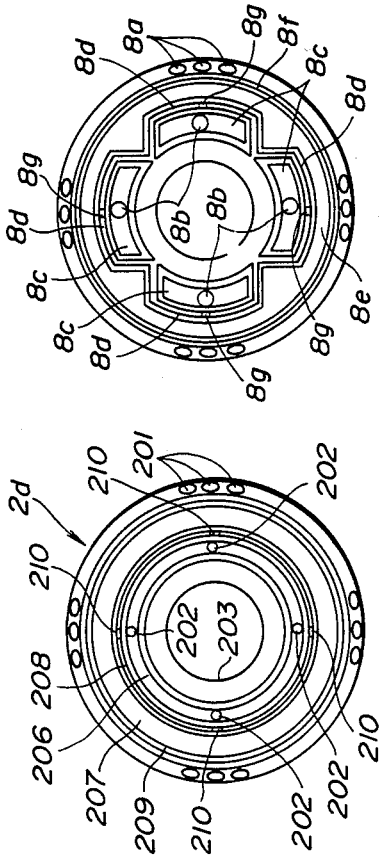
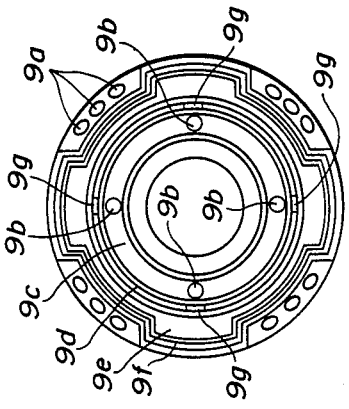
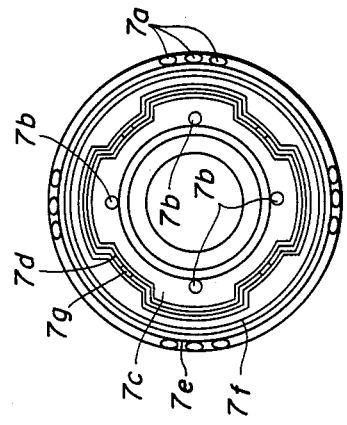

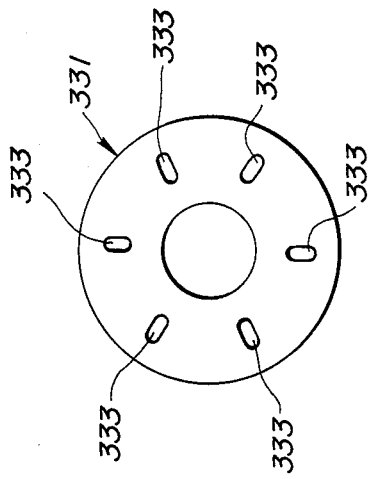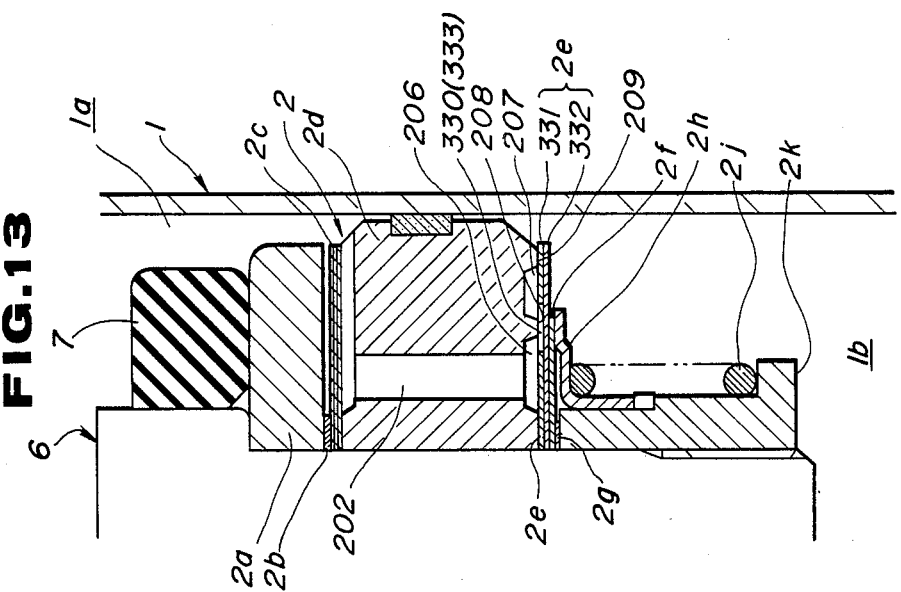

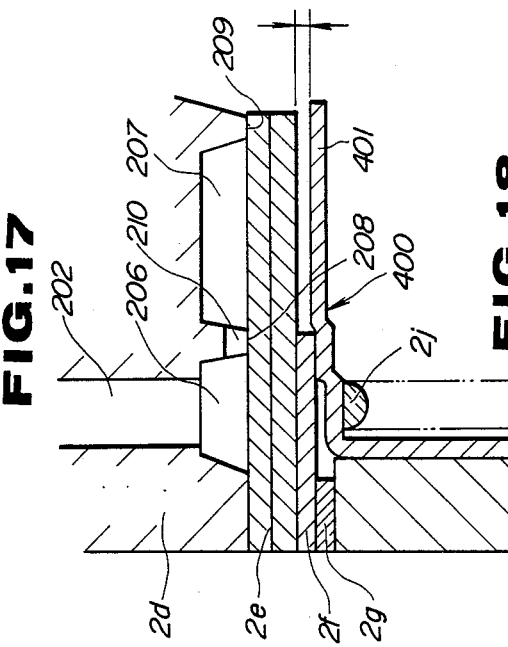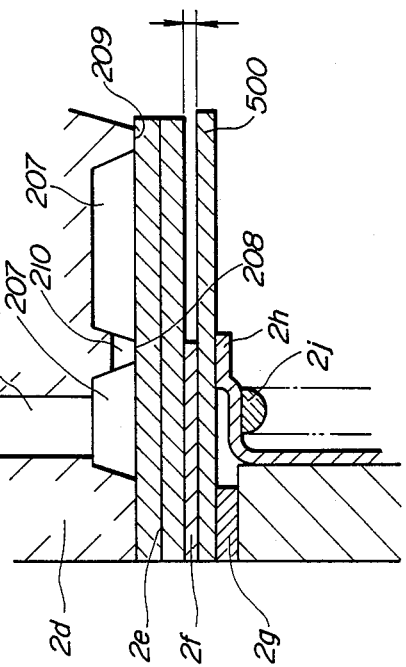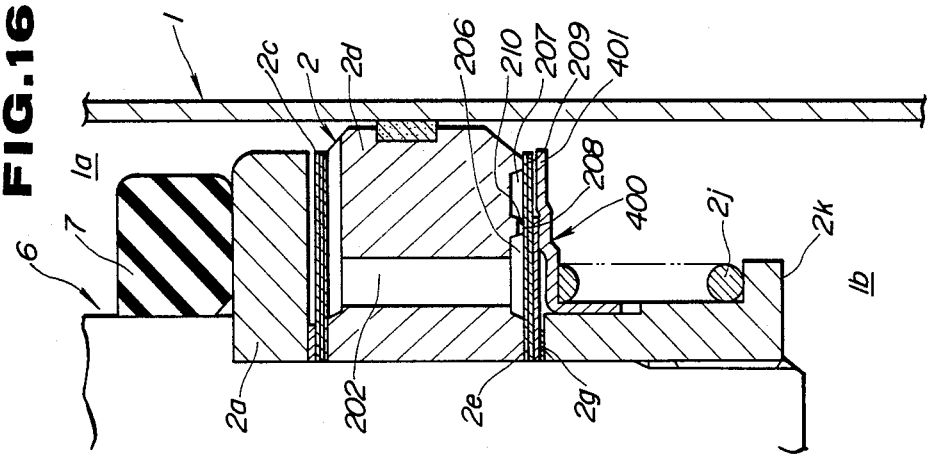

SHOCK ABSORBER

BACKGROUND OF THE INVENTION

1. Field of the Invention

The present invention relates generally to a hydraulic shock absorber, suitable for use in an automotive suspension system. More specifically, the invention relates to a valve construction in a hydraulic shock absorber.

2. Field of the Invention

Japanese Utility Model First (unexamined) Publication (Jikkai) Showa 62-107131 discloses one of typical construction of a conventional shock absorber. The disclosed shock absorber has a piston body separating the internal space of a shock absorber cylinder into upper and lower fluid chambers, and a base body which separates the lower fluid chamber from a reservoir chamber defined between inner and outer cylinders. The piston body and the base body are formed with orifices. An annular projection with plane tip end surface is formed at an orientation radially outward of the orifices. A constant orifice is formed through the annular projection. A valve plate is biased and seated onto the plane tip end surface.

Accordingly, in the relatively low piston stroke, valve plate is maintained in contact with the contacting surface of the annular projection. Therefore, the working fluid only through the constant orifice to generate absorption in a characteristics proportional to square of the piston stroke speed. On the other hand, in the intermediate and high piston stroke speed, the valve plate is deformed to generate absorption in a characteristics proportional to two over three power of the piston stroke speed. With such construction, when the piston stroke speed is lower then a relief speed at which the valve plate is deformed to open, all of the working fluid flows through constant orifice of constant path area. Therefore, the absorption characteristics becomes proportional to two power of the piston stroke speed. Accordingly, leakage through gaps between the piston and cylinder and between the piston rod and guide will cause substantial influence for the shock absorbing characteristics. In order words, the such leakage causes equivalent effect to variation of the path area in the constant orifice. Therefore, fluctuation of shock absorbing characteristics particularly at the low piston stroke range becomes significant.

In addition, when the absorption is set at the piston stroke speed of 0.1 m/s, the absorption characteristics can be uniformly determined in a piston stroke speed range lower than the set speed. Therefore, freedom of setting of the absorption characteristics is unacceptably narrow.

SUMMARY OF THE INVENTION

Therefore, it is an object of the present invention to provide a shock absorber which can overcome the drawback in the prior art set forth above.

Another object of the invention is to provide a shock absorber which can minimize fluctuation of absorption characteristics in low piston stroke speed range.

A further object of the invention is to provide a shock absorber which can provide greater freedom in setting shock absorbing characteristics, particular in the low piston stroke speed range.

In order to accomplish aforementioned and other objects, a shock absorber, according to the present invention, is provided a piston stroke dependent variable shock absorbing characteristics by means of a first and second flow restriction means associated with a piston. The first and second flow restriction means are arranged in a fluid path for communicating first and second working chambers defined within a shock absorber cylindrical housing in series. The first flow restriction means associated with an orifice forming a part of the fluid path and has a predetermined relief pressure, for providing a predetermined first fixed flow restriction rate in response to a pressure difference between the first and second chambers smaller than or equal to the relief pressure and providing a second variable flow restriction rate in response to a pressure difference between the first and second chambers greater than the relief pressure. The second flow restriction means is associated with the orifice for providing a third variable flow restriction rate variable depending upon the pressure difference between the first and second chamber.

According to one aspect of the invention, a valve construction for a hydraulic shock absorber disposed between relatively displaceable first and second members for absorbing energy of relative displacement between the first and second members, comprises:

a valve body disposed between a hollow cylindrical housing for separating the internal space of the housing into a first and second chambers;

means for defining an orifice formed through the valve body for communication between the first and second chambers for permitting fluid flow for balancing fluid pressure between the first and second chambers;

first flow restriction means associated with the orifice and having a predetermined relief pressure, for providing a predetermined first fixed flow restriction rate in response to a pressure difference between the first and second chambers smaller than or equal to the relief pressure and providing a second variable flow restriction rate in response to a pressure difference between the first and second chambers greater than the relief pressure; and second flow restriction means, associated with the orifice and arranged in series with the first flow restriction means, for providing a third variable flow restriction rate variable depending upon the pressure difference between the first and second chamber.

According to another aspect of the invention, hydraulic shock absorber to be disposed between a first and second members relatively movable to each other for absorbing an energy causing relative movement between the first and second members, comprises:

a hollow cylindrical housing filled with a working fluid, the cylindrical housing being mechanically associated with the first member for axial movement therewith;

a piston disposed within the internal space of the cylindrical housing for separating the internal space of the cylindrical housing into first and second working chambers, the piston being mechanically associated with the second member for axial movement therewith;

means for defining an orifice formed through the piston for communication between the first and second chambers for permitting fluid flow for balanacing fluid pressure between the first and second chambers;

first flow restriction means associated with the orifice and having a predetermined relief pressure, for providing a predetermined first fixed flow restriction rate in response to a pressure difference between the first and second chambers smaller than or equal to the relief pressure and providing a second variable flow restriction rate in response to a pressure difference between the first and second chambers greater than the relief pressure; and second flow restriction means, associated with the orifice and arranged in series with the first flow restriction means, for providing a third variable flow restriction rate variable depending upon the pressure difference between the first and second chamber.

The piston may be movable according to movement of the second member relative to the second member at a speed corresponding to the motion speed of the first member, the first flow restriction means varies the the second flow restriction rate as a function of the relative motion speed of the piston and the cylindrical housing, and the second flow restriction means varies the third flow restriction rate as a function of the relative motion speed of the piston and the cylindrical housing. The first flow restriction means may produces a absorbing force for restricting relative motion between the first and second members, which varies in a rate proportional to two power of the motion speed of the piston when flow restriction rate is maintained at the first flow restriction rate and varying in a rate proportional to two over three power of motion speed of the piston when flow restriction rate is the second flow restriction rate, and the second flow restriction varies the absorbing force for restricting relative movement between the first and second members, in proportion to two over three power of the motion speed of the piston.

The first and second flow restriction means may be cooperated with each other for varying absorbing force to restrict relative movement between the first and second members in substantially in linear fashion.

The shock absorber may further comprise a resilient member commonly associated with the first and second flow restriction means for varying flow restriction rate in the first flow restriction means over the first and second flow restriction rates and for varying flow restriction rate in the second flow restriction means in the third flow restriction rate.

The shock absorber may also comprises means for defining a first groove on one axial end surface of the piston for communication with the orifice, and a second groove on the one axial end surface in an orientation radially and outwardly offset from the first groove, the first flow restriction means is active between the first and second grooves for permitting fluid flow between the first and second grooves at a limited flow rate by one of the first and second flow restriction rate, and the second flow restriction means is active at the second groove for permitting fluid flow from the second groove to one of the first and second chambers at a limited flow rate by the third flow restriction rate. Furthermore, the shock absorber may comprises a resilient biasing means associated with the resilient member for exerting biasing force for the section of the resilient member oriented at a position corresponding to the orientation of the first groove so as to assure the first flow restriction rate of the first flow restriction means at a pressure difference between the first and second chambers smaller than or equal to the predetermined relief pressure. The resilient biasing means preferably comprises a disc member having a diameter to place the outer circumferential edge at an orientation substantially corresponding to the outer edge of the first groove, and a bias spring acting on the disc member for exerting biasing force to the resilient member therethrough.

The first and second grooves may be so constructed as to exert greater hydraulic force is effective on the section of the resilient member at the orientation corresponding to the second groove than that on the section of the resilient member at the orientation corresponding to the first groove.

A first land may be defined between the first and second groove and have a first seating surface establishing sealing contact with the resilient member, and a second land may extend along the edge of the second groove and have a second seating surface establishing sealing contact with the resilient member, the first seating surface being oriented at axially offset position with respect to the second seating surface.

The first flow restriction means may include a constant path area orifice defined through the first land and means for forming a gap between the resilient means and the first seating surface in response to the pressure difference greater than the relief pressure. In the alternative, the first flow restriction means may include a constant path area orifice defined through the resilient means for permitting fluid flow from the first groove to the second groove over the first land, and means for forming a variable path area gap between the resilient means and the first seating surface in response to the pressure difference greater than the relief pressure.

In addition, the shock absorber may further comprise a stopper means associated with the resilient member for limiting magnitude of deformation of the resilient member.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 6 is a bottom view of a piston body employed in the preferred embodiment of the shock absorber of FIG. 1;

FIGS. 7, 8, 9, 10 and 11 are bottom views of modifications of piston bodies which can be employed in the preferred embodiment of the shock absorber of FIG. 1;

FIG. 13 is a partial section of a further embodiment of the shock absorber according to the present invention;

FIG. 14 shows a bottom view of a valve plate employed in the shock absorber of FIG. 13;

FIG. 15 shows a bottom view of the modified construction of the valve plate to be employed in the shock absorber of FIG. 13;

FIG. 16 is a partial section of a still further embodiment of the shock absorber according to the present invention;

FIG. 17 is an enlarged partial section of the major section of the shock absorber of FIG. 16; and FIG. 18 is a partial section of a yet further embodiment of the shock absorber according to the invention.

DESCRIPTION OF THE PREFERRED EMBODIMENT

Figure 1:
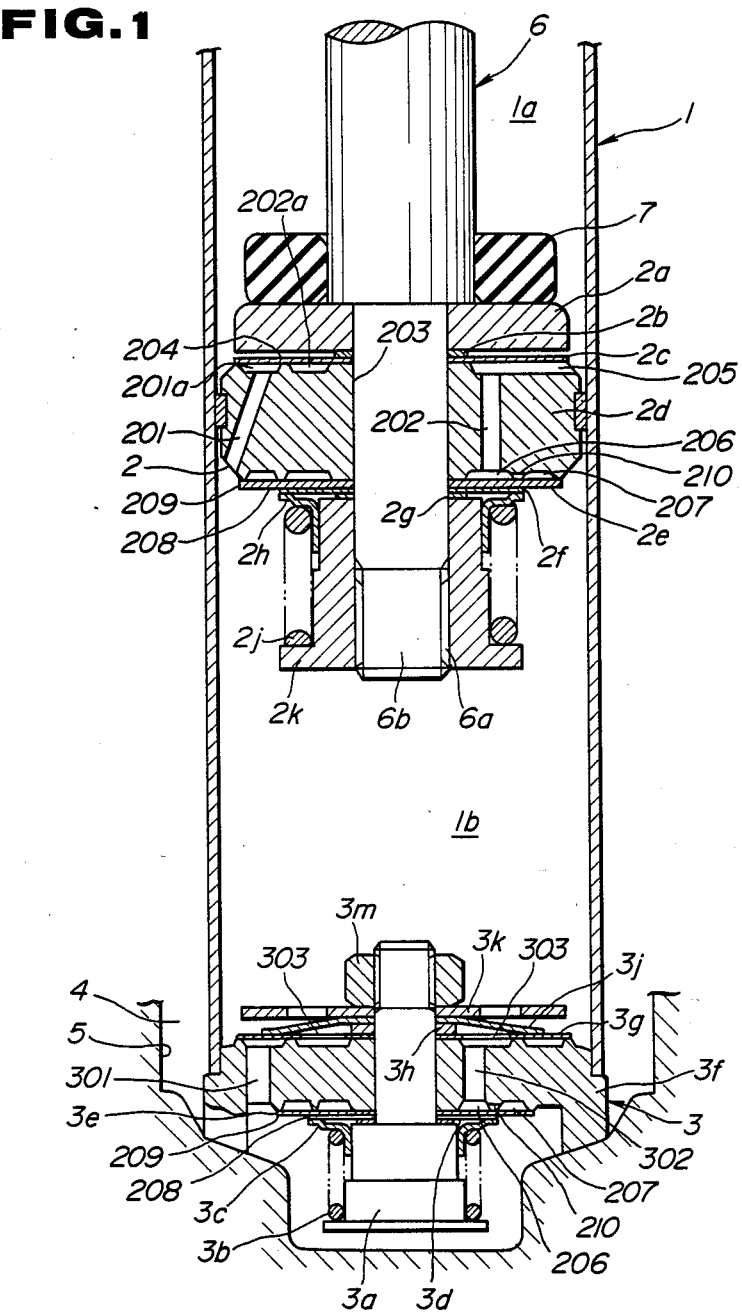
FIG. 1 is a section of the preferred embodiment of a shock absorber according to the present invention.

Referring now to the drawings, particularly to FIG. 1, the first embodiment of a shock absorber, according to the present invention, has a cylinder tube 1 defining an internal space filled with a working fluid. Though FIG. 1 shows only one cylinder, the shown embodiment is constructed as double-action type shock absorber including coaxially arranged inner and outer cylinders. The cylinder tube 1 illustrated in FIG. 1 is the inner cylinder. The outer cylinder is partially illustrated and represented by the reference numeral 5. As seen from FIG. 1, the outer cylinder 5 may comprise a bottomed cylinder tube. The coaxially arranged inner and outer cylinder tubes 1 and 5 define therebetween a sectionally annular reservoir chamber 4. The inner cylindrical tube 1 defines an internal space filled with a hydraulic working fluid.

A piston assembly 2 is disposed within the internal space of the inner cylinder 1 to divide the space into upper and lower working chambers 1a and 1b. The lower working chamber 1b is communicated with the fluid reservoir chamber 4 via a bottom valve assembly 3. Though the drawings does not clearly show, the reservoir chamber 4 comprises a lower section filled with the hydraulic working fluid, which lower section is in communication with the lower working chamber 1b, and an upper section filled with a gaseous or gas phase working fluid. The pressure of the gaseous working fluid filled in the upper section of the fluid reservoir chamber 4 is adjusted at a predetermined pressure so that the hydraulic working fluid pressure in the upper and lower working chambers 1a and 1b at the neutral and static condition of the shock absorber can be set at a predetermined neutral pressure.

Figure 2:
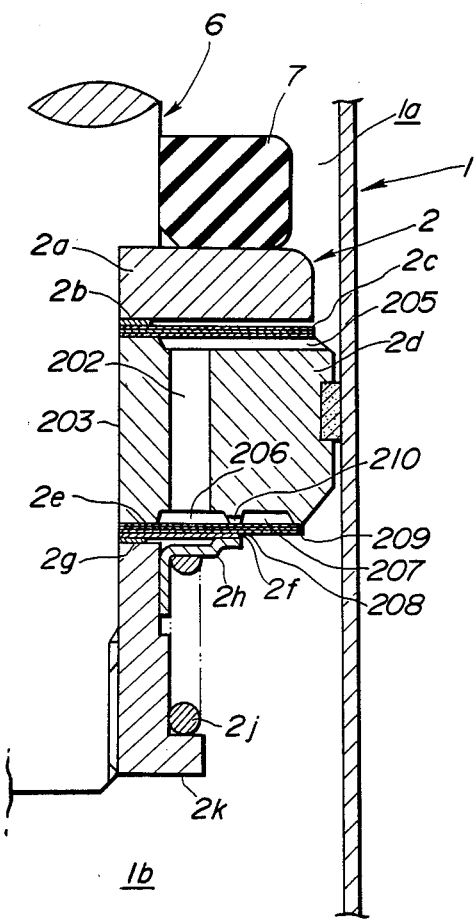
FIG. 2 is an enlarged partial section of the preferred embodiment of the shock absorber of FIG. 1.

The piston assembly 2 is fixedly mounted on the lower end portion of a piston rod 6 which is connected to a vehicular body at the upper end. As shown in FIGS. 1 and 2, the piston rod 6 has a smaller diameter piston receptacle section 6b with a threaded lower end 6a. The piston assembly 2 comprises a retainer 2a, a washer 2b, an upper valve plate 2c, a piston body 2d, a lower valve plate 2e, a smaller diameter disc plate 2f, a washer 2g, a retainer 2h and a valve spring 2j. These components of the piston assembly 2 is assembled to the piston receptacle section 6b of the piston rod 6 in order with a rubber bushing 7, as shown. A fastening nut 2k engages with the threaded end 6a of the piston rod so that the piston assembly 2 can be firmly fixed onto the lower end portion of the piston rod.

The piston body 2d is formed with a center opening 203, through which the smaller diameter piston receptacle section 6b of the piston rod 6 extends. The piston body 2d is also formed with a plurality of through holes 201 and a plurality of orifices 202 at radially and circumferentially offset position to each other. As shown in FIG. 1, the through holes 201 extends oblique to the axis of the piston rod 6 and have upper ends opening to an outer annular groove 201a formed on the upper plane surface of the piston body 2d. The lower end of each of the through hole 201 directly opens to the lower working chamber 1b at the circumferentially extending tapered edge portion of the piston body. On the other hand, the orifices 202 extend in parallel to the axis of the piston rod 6. Each of the orifices 202 has an upper end opening to an inner annular groove 202a. The inner annular groove 202a is formed coaxially with the outer annular groove 201a and separated by an annular land formed therebetween, which land has an upper plane surface 204 serving as a contact surface for establishing sealing contact with the lower surface of the upper valve plate 2c. Both of the annular grooves 201a and 202a are communicated with the upper working chamber 1a via a communication path groove 205 extending through the land. The lower end of each orifice 202 opens to an inner annular groove 206. The annular groove 206 is formed on the lower plane surface of the piston body 2d. An outer annular groove 207 is coaxially formed with the inner annular groove 206 on the lower plane surface of the piston body 2d. These annular grooves 206 and 207 are generally separated by an annular land formed therebetween. The land has a plane lower surface 208 on which the upper surface of the lower valve plate 2e is seated for establishing sealing contact. Another and outer annular land is also formed on the lower surface of the piston rod, which outer annular land has a lower plane surface 209 to sealingly contact with the upper surface of the lower valve plate 2e. The annular grooves 206 and 207 are communicated to each other via a constant orifice 210 radially extending through the inner land.

As shown in FIG. 2, the lower valve plate 2e comprises a three annular disc shaped members piled up or laminated to each other. These annular disc shaped members are formed by a resilient material such as leaf spring material, for resilient deformation in response to a working fluid pressure greater than a predetermined pressure. These annular discs are provided an initial resilient force to resiliently and sealingly contact with the surfaces 208 and 209 of the lands. The lower valve plate 2e is associated with the smaller diameter disc 2f. The smaller diameter disc 2f has outer diameter substantially corresponding to the external diameter of the inner annular groove 206. The smaller diameter disc 2f is associated with a valve spring 2j which is retained by means of a retailer 2h. The valve spring 2j normally biases the smaller diameter disc 2f upwardly and whereby bias the lower valve plate 2e onto the surfaces 208 and 209.

The operation of the first embodiment of the shock absorber as set forth above will be discussed hereinafter in terms of different modes of operations.

Low Piston Stroke Speed Mode

Assuming that the piston assembly strokes in rebounding direction at relatively low stroke speed, the volume of the upper working chamber 1a decreases according to upward movement of the piston assembly 2. According to decreasing of the volume, the fluid pressure in the upper fluid chamber 1a increases. Alternatively, according to the upward movement of the piston assembly 2, the volume of the lower working chamber 1b increase to lower the fluid pressure. Therefore, pressure balance is destroyed. Therefore, the working fluid in the upper working chamber 1a flows into the orifice 202 through the communication path groove 205. The pressurized fluid flows through the inner groove 206, the constant orifices 210 and the outer groove 207. By the pressure of the working fluid in the outer groove 207, the circumferential portion of the valve plate 2e is deformed to permit the working fluid to flow into the lower working chamber 1b at a limited flow rate.

Figure 3:
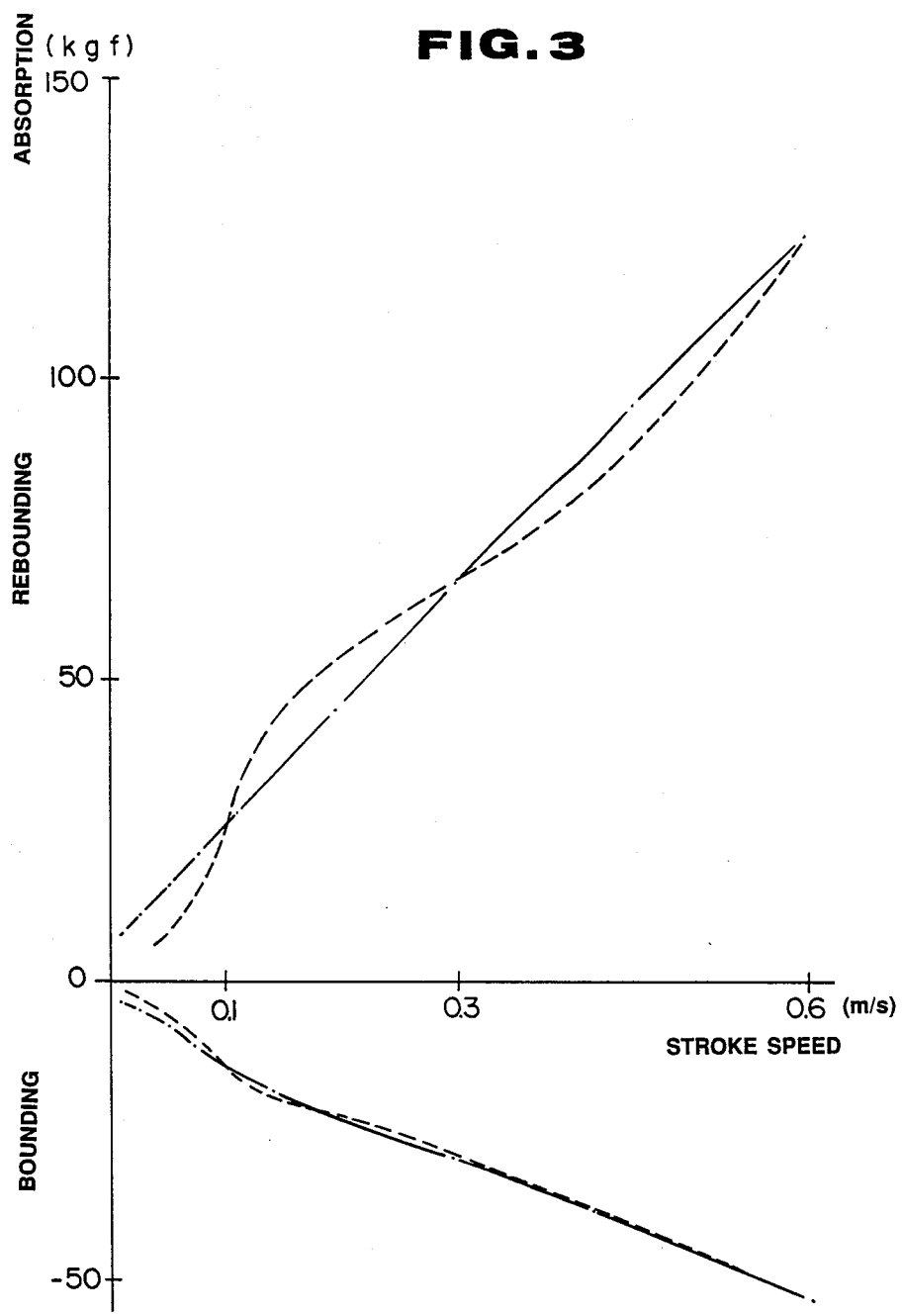
FIG. 3 is a chart showing variation of absorption (kgf) in bounding and rebounding stroke in relation to piston stroke speed.
Figure 4:
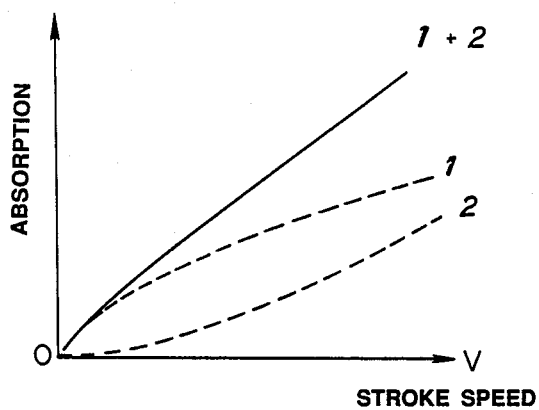
FIG. 4 is a graph showing absorbing characteristics of the preferred embodiment of the shock absorber of FIG. 1.

During this action, by flow restriction for the pressurized fluid by the constant orifice creates absorption. The magnitude of absorption at the constant orifice 210 is proportional to two power of the piston stroke speed, as illustrated by broken line (2) in FIG. 4. On the other hand, flow restriction through the gap formed between the circumferential portion of the valve plate 2e and the surface 209 creates another absorption, magnitude of which is proportional to two over three of the piston stroke speed, as illustrated by the broken line (1) in FIG. 4. By providing such flow restriction in tandem fashion, the total absorption characteristics obtained becomes as that illustrated by solid liens in FIGS. 3 and 4. As can be seen from FIG. 3, the absorption characteristics obtained by such arrangement essential linearly proportional to the piston stroke speed. This can be compared with the absorption characteristics obtained in the prior art. Therefore, according to the shown embodiment, fluctuation of the absorption in the low piston stroke range can be minimized.

Intermediate and High Piston Stroke Mode

Assuming that the piston assembly 2 strokes in rebounding direction at intermediate and high speed, the pressure difference between the upper and lower fluid chambers 1a and 1b becomes greater than that in the low piston stroke mode. In such case, greater hydraulic pressure is exerted on the lower valve plate 2e to cause greater magnitude deformation with downward shifting of the smaller diameter disc 2f as the hydraulic force overcoming the spring force of the valve spring 2j. Therefore, the portion of the valve plate 2e mating with the surface 208 of the land is shifted away from the mating surface 208. Therefore, annular flow restricting orifice is formed between the mating surfaces of the valve plate 2e and the land.

Figure 5:
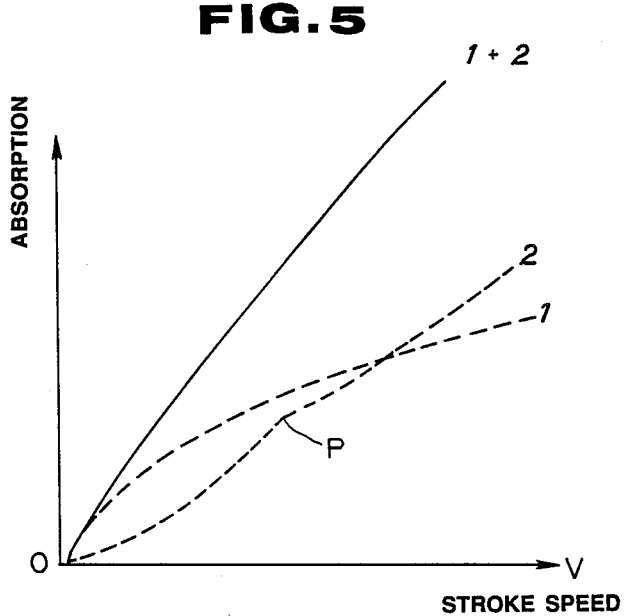
FIG. 5 is a graph showing absorbing characteristics of the present invention of the shock absorber in low piston stroke speed.

By this, the magnitude of absorption created by flow restriction in the gap formed between the valve plate 2e and the surface 208 become proportional to two over three power of the piston stroke speed, as illustrated by the broken line (2) in FIG. 5. By combining this absorption characteristics with the absorption characteristics at the annular gap or orifice formed between the valve plate 2e and the surface 209 of the outer annular land, as illustrated by the broken line (1) of FIG. 5. Therefore, by arranging the annular orifices in tandem fashion, substantially linear absorption characteristics can be obtained, as illustrated by solid line ((1) +(2)) in FIG. 5. As will be appreciated herefrom, linear absorption characteristics can be obtained even at the intermediate or high piston stroke speed range.

The smaller diameter disk 2f and retainer 2h specifies the position to exert the spring force of the valve spring 2j at the position corresponding to the position of the valve plate 2e contacting with the surface 208 of the land. This stably define the position to exert the spring force. On the other hand, since the resilience of the valve plate 2f can be adjusted by adjusting thickness of each resilient member as the component or by varying number of the resilient member to be laminated. Since the absorption characteristics is variable depending upon the stiffness of the valve plate 2e, by adjusting the thickness of the resilient member and/or changing number of the resilient plate, absorption characteristics can be adjusted for obtaining desired characteristics.

In the preferred construction, the outer groove 207 may be provided wider width than the inner groove 206 for provided wider path area. This makes the greater force to be exerted on the section of the valve plate 2e corresponding to the groove 207 that that exerted on the section corresponding to the groove 206. This assures that the section of the valve plate 2e mating with the surface 208 of the inner annular land is maintained sealing contact in the low piston stroke speed range. Therefore, in response to the low speed piston stroke, greater absorption can be generated in comparison with that to be created in response to the intermediate or high speed of piston stroke.

Here, in case of the application of the shock absorber for the automotive suspension system, lower piston stroke speed and greater magnitude of vibration can be induced in a vehicle body to cause vehicular body attitude change. On the other hand, higher piston stroke speed and smaller magnitude of vibration can be input through the road wheels as road shock. For the vehicle body induced vibration, it is desired to generate sufficient damping force to suppress vehicular body attitude change for better driving stability. On other hand, for the road shock, softer suspension characteristics so as not to transmit the vibration to the vehicle body for preventing rough ride feeling which otherwise caused by the vibration transmitted to the vehicle body. Therefore, the absorption characteristics provided by the aforementioned first embodiment of the shock absorber may accomplish both of the riding comfort and driving stability.

In the shown embodiment of FIGS. 1 and 2, additional absorption can be generated by the bottom valve assembly 3. The bottom valve assembly 3 comprises a valve spring 3b, a retainer 3c, a disc plate 3d, a lower valve plate 3e, a valve body 3f, an upper valve plate 3g, a washer 3h, s check spring 3j and a retainer 3k. These components are assembled to a bolt 3a in order, as shown. The components are secured to the bolt 3a by means of a fastening nut 3m. As seen, the valve body 3f is rigidly engaged to the lower end of the inner cylinder 1 to secure the bottom valve assembly 3.

The valve body 3f is formed with through holes 301 and orifices 302. The upper end of the through holes 301 is closed be the valve plate 3g. On the other hand, the lower end of the through hold 301 is opened to the reservoir 4. With this construction, the fluid flow from the reservoir chamber 4 to the lower working chamber 1b is permitted and the fluid flow in the opposite direction is blocked.

The lower ends of the orifices 302 open to an annular groove 206 which extends coaxially with an outer annular groove 207. Inner and outer lands are formed along the circumferential edges of the outer annular grooves 207 form seat surfaces 208 and 209 for the valve plate 3e. The upper ends of the orifices 302 open to an annular groove formed on the upper surface of the valve body, which annular groove is in communication with the lower working chamber 1b via a through openings 303 formed in the upper valve plate 3k. Therefore, the orifices permit fluid flow from the lower working chamber 1b to the reservoir chamber 4 and blocks fluid flow in the opposite direction.

Similarly to the foregoing piston assembly, the bottom valve assembly 3 operates in two different mode depending upon the piston stroke. Each mode of operations will be discussed herebelow.

Low Piston Stroke Speed Mode

Assuming the piston strokes in bounding direction with compressing the lower working chamber 1b at low speed, the pressurized fluid flows through the through openings 303, the annular groove on the upper surface of the valve body 3f and the orifices 302 and then flows through the constant orifice 210 formed through the inner annular land formed between the inner and outer grooves 206 and 207. The fluid pressure in the groove 207 acts on the valve plate 3e to cause deformation for establishing fluid communication between the lower fluid chamber 1b and the fluid reservoir chamber 4 so as to permit the fluid flow from the lower working chamber to the fluid reservoir chamber. During this mode of operation, the magnitude of absorption produced at the constant orifice is proportional to two power of the piston stroke speed. On the other hand, the magnitude of absorption created at the gap formed between the valve plate 3e and the seating surface 209 of the outer annular land, is proportional to two over three of the piston stroke speed. Therefore, similarly to that in the low piston stroke mode of the piston assembly, linear characteristics of variation of absorption in relation to the piston stroke speed can be obtained

Intermediate and High Piston Stroke Speed

In the piston bounding stroke at intermediate or high stroke speed, the greater fluid pressure in the grooves 206 and 207 acts on the valve plate 3e to cause greater magnitude of deformation in the valve plate. Therefore, the valve plate 3e is placed away from the seating surface 208 as well as from the seating surface 209. Therefore, the characteristics of variation of absorption becomes proportion to two over three power of the piston stroke speed.

Similarly to the piston assembly, the smaller diameter disc 3d and the valve spring 3b specify the position to exert the spring force to assure steady variation of the absorption in relationship to the piston stroke speed. Furthermore, the valve plate 3e comprises a plurality of resilient members laminated to each other. Similarly to the valve plate 2e of the piston assembly 2, the variation characteristics of absorption can be adjusted by adjusting the thickness of each resilient member and/or by adjusting number of resilient members to be laminated.

FIG. 7 shows modification of the foregoing first embodiment of the shock absorber according to the invention. In FIG. 7, the piston assembly has a valve body formed with through holes 7a, orifices 7b, an inner groove 7c, an outer groove 7e, inner and outer lands having valve seating surfaces 7d and 7f. Constant orifices 7g are formed through the inner annular land for establishing fluid communication between the inner and outer grooves 7c and 7e. As seen, the outer circumferential edge of the inner groove 7c and the inner circumferential edge of the outer groove 7e are parallel to each other and formed into non-circular configuration. Namely, the width of the inner groove 7c is widened at the orientation where the orifices 7b.

FIG. 8 shows another modification of the foregoing first embodiment of the shock absorber according to the invention. In FIG. 8, the piston assembly has a valve body formed with through holes 8a, orifices 8b, an inner groove 8c, an outer groove 8e, inner and outer lands having valve seating surfaces 8d and 8f. Constant orifices 8g are formed through the inner annular land for establishing fluid communication between the inner and outer grooves 8c and 8e. As seen, the inner groove 8c is separated into a plurality of arc shaped segments oriented at the orientations where the orifices 8b is provided.

FIG. 9 shows another modification of the foregoing first embodiment of the shock absorber according to the invention. In FIG. 9, the piston assembly has a valve body formed with through holes 9a, orifices 9b, an inner groove 9c, an outer groove 9e, inner and outer lands having valve seating surfaces 9d and 9f. Constant orifices 9g are formed through the inner annular land for establishing fluid communication between the inner and outer grooves 9c and 9e. As seen, the inner groove 9c is formed into circular configuration. On the other hand, the outer groove has alternatively arranged narrower width sections and wider width sections. The wider width sections are arranged at orientations where the constant orifices 9g are formed.

FIG. 10 shows another modification of the foregoing first embodiment of the shock absorber according to the invention. In FIG. 10, the piston assembly has a valve body formed with through holes 10a, orifices 10b, an inner groove 10c, an outer groove 10e, inner and outer lands having valve seating surfaces 10d and 10f. Constant orifices 10g are formed through the inner annular land for establishing fluid communication between the inner and outer grooves 10c and 10e. As seen, the inner groove 10c is formed into circular configuration. On the other hand, the outer groove 10e is separated into a plurality of arc shaped segments oriented at the orientations where the constant orifices 10g are provided.

FIG. 11 shows another modification of the foregoing first embodiment of the shock absorber according to the invention. In FIG. 11, the piston assembly has a valve body formed with through holes 11a, orifices 11b, an inner groove 11c, an outer groove 11e, inner and outer lands having valve seating surfaces 11d and 11f. Constant orifices 11g are formed through the inner annular land for establishing fluid communication between the inner and outer grooves 11c and 11e. As seen, the inner groove 11c is separated into a plurality of arc shaped segments. On the other hand, the outer groove 11e is also separated into a plurality of arc shaped segments oriented at the orientations where the constant orifices 11g are provided.

Figure 12:
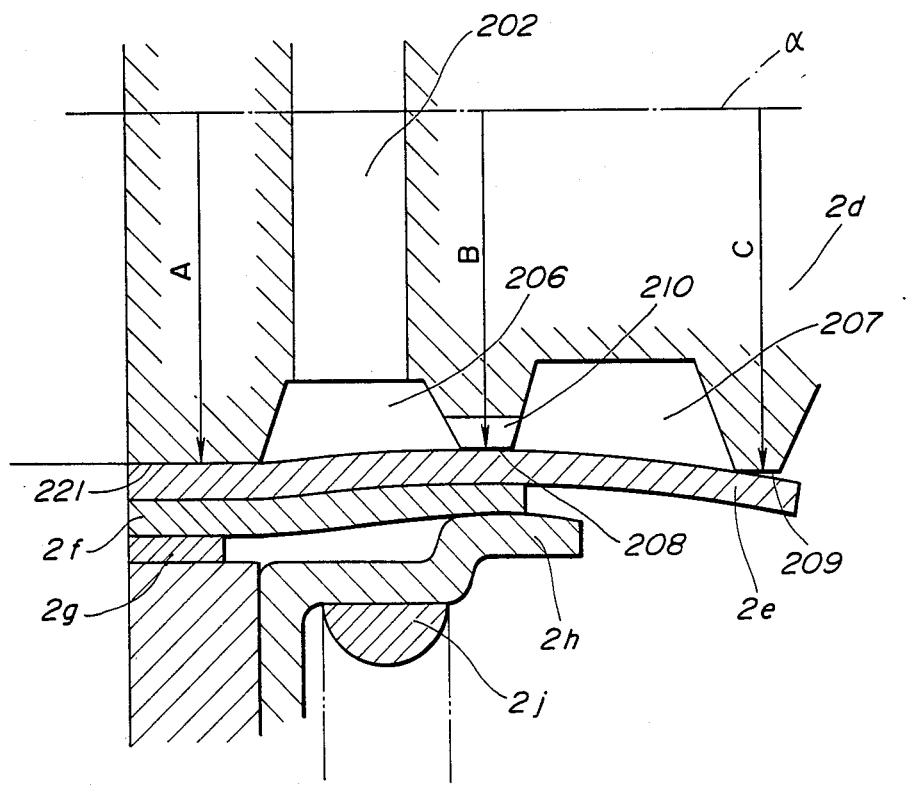
FIG. 12 is an enlarged partial section of another embodiment of the shock absorber according to the present invention.

FIG. 12 shows the second embodiment of a shock absorber according to the present invention. The shown embodiment has essentially the same construction to the aforementioned first embodiment except for the following particular points. Therefore, in order to avoid redundant discussion which may cause confusion, the common part will neglected from the drawings and discussion given herebelow.

In the shown embodiment, the lower surface 221 of the piston body 2d oriented at the inside of the inner annular groove 206 has height lower than the valve seating surface 209 of the outer annular land so that the valve seating surface 209 projects downwardly from the plane extending through the surface 221. On the other hand, the height of the valve seating surface 208 is set lower than the level of the surface 221. Namely, the downward distance from a reference plane a to respective surfaces 221, 208 and 209 are respectively A, B and C. These three distances are so related to establish the relationship of C>A>B.

With the construction set forth above, the valve plate 2e is deformed at the section between the surfaces 221 and 208 and at the section between the surfaces 208 and 209. Therefore, the valve plate 2e can be set in pre-stressed fashion to increase contact force in contacting with the associated seating surface to assure liquid tight seal. This causes variation rate of the absorption relative to variation of the piston stroke speed can be increased. Furthermore, a pressure relieving point at the valve seating surface 208 can be risen to the higher level. This expands possible variation rang of the absorption.

FIG. 13 shows the third embodiment of the shock absorber according to the present invention. The shown embodiment of the shock absorber has essentially the identical construction to that of the first embodiment except for the construction of the constant orifices.

In the shown embodiment, the constant orifices formed through the land formed between the grooves 206 and 207 in the former embodiments are replaced by a hole or groove 330 formed in the uppermost resilient member 331 of the valve plate 2e. The second layer resilient member 332 forms the bottom of the hole 330 to define paths bypassing the land so as to form constant orifice between the valve seating surface 208 and the upper surface of the second layer resilient member 332. As shown in FIG. 14, the holes 330 are arranged with regular intervals. Alternatively, hole 330 in FIG. 14 can be replaced with the cut-out 333a illustrated in FIG. 15.

FIGS. 16 and 17 shows the fourth embodiment of the shock absorber according to the present invention. In this embodiment, the retainer 400 for the valve spring 21 is formed with a radially extending flange 401 having a diameter slightly greater than the diameter of the valve plate 2e. The flange 401 opposes to the valve plate 2e with a predetermined clearance D therebetween. The flange 401 serves as stopper flange for restricting deformation range of the valve plate 2e.

The presence of the flange 401 allows to form the valve member with resilient members having lower resilient coefficient. Therefore, initial response of the valve member in causing deformation can be set higher. On the other hand, since the flange 401 prevents the valve plate 2e from causing excessive deformation.

By limiting the deformation range, left of the valve plate can be expanded.

As shown in FIG. 18, the flange 401 of the retainer 400 in the embodiment of FIG. 17, can be replaced with a stopper plate 500 formed separately from the retainer 2h. The stopper plate 500 may provide substantially the same effect to that achieved by the embodiment of FIG. 17.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiments are illustrated in terms of the shock absorber with constant resilient force of valve spring, the valve spring may comprise a progressive spring to vary the spring force depending upon the piston stroke. In addition, the second and subsequent embodiments may be applicable not only for the piston assembly but also for the bottom valve assembly.

What is claimed is:

1. A valve construction for a hydraulic shock absorber disposed between relatively displaceable first and second members for absorbing energy of relative displacement between said first and second members, comprising:
   a valve body disposed between a hollow cylindrical housing for separating the internal space of said housing into a first and second chambers;
   means for defining an orifice formed through said valve body for communication between said first and second chambers for permitting fluid flow for balancing fluid pressure between said first and second chambers;
   first flow restriction means associated with said orifice and having a predetermined relief pressure, for providing a predetermined first fixed flow restriction rate in response to a pressure difference between said first and second chambers smaller that or equal to said relief pressure and providing a second variable flow restriction rate in response to a pressure difference between said first and second chambers greater than said relief pressure; and
   second flow restriction means, associated with said orifice and arranged in series with said first flow restriction means, for providing a third variable flow restriction rate variable depending upon the pressure difference between said first and second chamber.

2. A valve construction as set forth in claim 1, wherein said valve body is movable according to movement of said first member relative to said second member at a speed corresponding to the motion speed of said first member, said first flow restriction means varies said second flow restriction rate as a function of the motion speed of said valve member, and said second flow restriction means varies said third flow restriction rate as a function of the motion speed of said valve body.

3. A valve body as set forth in claim 2, wherein said first flow restriction means produces a absorbing force for restricting relative motion between said first and second members, which varies in a rate proportional to two power of the motion speed of said valve body when flow restriction rate is maintained at said first flow restriction rate and varying in a rate proportional to two over three power of motion speed of said valve body when flow restriction rate is said second flow restriction rate, and said second flow restriction varies the absorbing force for restricting relative movement between said first and second members, in proportion to two over three power of said motion speed of said valve body.

4. A valve body as set forth in claim 2, wherein said first and second flow restriction means are cooperated with each other for varying absorbing force to restrict relative movement between said first and second members in substantially in linear fashion.

5. A valve body as set forth in claim 1, which further comprises a resilient member commonly associated with said first and second flow restriction means for varying flow restriction rate in said first flow restriction means over said first and second flow restriction rates and for varying flow restriction rate in said second flow restriction means in said third flow restriction rate.

6. A hydraulic shock absorber to be disposed between a first and second members relatively movable to each other for absorbing an energy causing relative movement between said first and second members, comprising:
a hollow cylindrical housing filled with a working fluid, said cylindrical housing being mechanically associated with said first member for axial movement therewith;
a piston disposed within the internal space of said cylindrical housing for separating the internal space of said cylindrical housing into first and second working chambers, said piston being mechanically associated with said second member for axial movement therewith;
means for defining an orifice formed through said piston for communication between said first and second chambers for permitting fluid flow for balanacing fluid pressure between said first and second chambers;
first flow restriction means associated with said orifice and having a predetermined relief pressure, for providing a predetermined first fixed flow restriction rate in response to a pressure difference between said first and second chambers smaller than or equal to said relief pressure and providing a second variable flow restriction rate in response to a pressure difference between said first and second chambers greater than said relief pressure; and
second flow restriction means, associated with said orifice and arranged in series with said first flow restriction means, for providing a third variable flow restriction rate variable depending upon the pressure difference between said first and second chamber.

7. A shock absorber as set forth in claim 6, wherein said piston is movable according to movement of said second member relative to said second member at a speed corresponding to the motion speed of said first member, said first flow restriction means varies said second flow restriction rate as a function of the relative motion speed of said piston and said cylindrical housing, and said second flow restriction means varies said third flow restriction rate as a function of the relative motion speed of said piston and said cylindrical housing.

8. A shock absorber as set forth in claim 7, wherein said first flow restriction means produces a absorbing force for restricting relative motion between said first and second members, which varies in a rate proportional to two power of the motion speed of said piston when flow restriction rate is maintained at said first flow restriction rate and varying in a rate proportional to two over three power of motion speed of said piston when flow restriction rate is said second flow restriction rate, and said second flow restriction varies the absorbing force for restricting relative movement between said first and second members, in proportion to two over three power of said motion speed of said piston.

9. A shock absorber as set forth in claim 7, wherein said first and second flow restriction means are cooperated with each other for varying absorbing force to restrict relative movement between said first and second members in substantially linear fashion.

10. A shock absorber as set forth in claim 6, which further comprises a resilient member commonly associated with said first and second flow restriction means for varying flow restriction rate in said first flow restriction means over said first and second flow restriction rates and for varying flow restriction rate in said second flow restriction means in said third flow restriction rate.

11. A shock absorber as set forth in claim 10, which further comprises means for defining a first groove on one axial end surface of said piston for communication with said orifice, and a second groove on said one axial end surface in an orientation radially and outwardly offset from said first groove, said first flow restriction means is active between said first and second grooves for permitting fluid flow between said first and second grooves at a limited flow rate by one of said first and second flow restriction rate, and said second flow restriction means is active at said second groove for permitting fluid flow from said second groove to one of said first and second chambers at a limited flow rate by said third flow restriction rate.

12. A shock absorber as set forth in claim 11, which further comprises a resilient biasing means associated with said resilient member for exerting biasing force for the section of said resilient member oriented at a position corresponding to the orientation of said first groove so as to assure said first flow restriction rate of said first flow restriction means at a pressure difference between said first and second chambers smaller than or equal to said predetermined relief pressure.

13. A shock absorber as set forth in claim 12, wherein said resilient biasing means comprises a disc member having a diameter to place the outer circumferential edge at an orientation substantially corresponding to the outer edge of said first groove, and a bias spring acting on said disc member for exerting biasing force to said resilient member therethrough.

14. A shock absorber as set forth in claim 11, wherein said first and second grooves are so constructed as to exert greater hydraulic force is effective on the section of said resilient member at the orientation corresponding to said second groove than that on the section of said resilient member at the orientation corresponding to said first groove.

15. A shock absorber as set forth in claim 11, wherein a first land defined between said first and second groove and having a first seating surface establishing sealing contact with said resilient member, and a second land extending along the edge of said second groove and having a second seating surface establishing sealing contact with said resilient member, said first seating surface being oriented at axially offset position with respect to said second seating surface.

16. A shock absorber as set forth in claim 15, wherein said first flow restriction means includes a constant path area orifice defined through said first land and means for forming a gap between said resilient means and said first seating surface in response to the pressure difference greater than said relief pressure.

17. A shock absorber as set forth in claim 15, wherein said first flow restriction means includes a constant path area orifice defined through said resilient means for permitting fluid flow from said first groove to said second groove over said first land, and means for forming a variable path area gap between said resilient means and said first seating surface in response to the pressure difference greater than said relief pressure.

18. A shock absorber as set forth in claim 11, which further comprises a stopper means associated with said resilient member for limiting magnitude of deformation of said resilient member.

* * * * *